(12) United States Patent
Prokopenko et al.

(10) Patent No.: US 7,898,550 B2
(45) Date of Patent: Mar. 1, 2011

(54) SYSTEM AND METHOD FOR MEMORY BANDWIDTH COMPRESSOR

(75) Inventors: Boris Prokopenko, Milpitas, CA (US); Timou Paltashev, Fremont, CA (US)

(73) Assignee: VIA Technologies, Inc., Taipei (TW)

( * ) Notice: Subject to any disclaimer, the term of this patent is extended or adjusted under 35 U.S.C. 154(b) by 957 days.

(21) Appl. No.: 11/749,842

(22) Filed: May 17, 2007

(65) Prior Publication Data

US 2007/0285417 A1 Dec. 13, 2007

Related U.S. Application Data

(60) Provisional application No. 60/812,204, filed on Jun. 9, 2006.

(51) Int. Cl.
*G06T 9/00* (2006.01)
*G06T 15/40* (2006.01)
*G09G 5/37* (2006.01)

(52) U.S. Cl. .................. 345/555; 345/422; 345/562

(58) Field of Classification Search ............. 345/422, 345/555, 562
See application file for complete search history.

(56) References Cited

U.S. PATENT DOCUMENTS 6,476,811 B1 11/2002 DeRoo et al.
2005/0093873 A1* 5/2005 Paltashev et al. ............ 345/581

* cited by examiner

*Primary Examiner*—Hau H Nguyen
(74) *Attorney, Agent, or Firm*—Thomas, Kayden, Horstemeyer & Risley, LLP (57) ABSTRACT

Various embodiments for reducing external bandwidth requirements for transferring graphics data are included. One embodiment includes a system for reducing the external bandwidth requirements for transferring graphics data comprising a prediction error calculator configured to generate a prediction error matrix for a pixel tile of z-coordinate data, a bit length calculator configured to calculate the number of bits needed to store the prediction error matrix, a data encoder configured to encode the prediction error matrix into a compressed block and a packer configured to shift the compressed block in a single operation to an external memory location.

20 Claims, 8 Drawing Sheets

SYSTEM AND METHOD FOR MEMORY BANDWIDTH COMPRESSOR

CROSS-REFERENCE TO RELATED APPLICATION

This application claims priority to, and the benefit of, U.S. Provisional Patent Application entitled, "Memory Bandwidth Compressor," filed on Jun. 9, 2006, having Ser. No. 60/812,204, which is incorporated by reference in its entirety.

TECHNICAL FIELD

The present disclosure generally relates to compression of graphics data. More particularly, the present disclosure relates to a system and method for compression and encoding of z data.

BACKGROUND

As is known, the art and science of three-dimensional ("3-D") computer graphics concerns the generation, or rendering, of two-dimensional ("2-D") images of 3-D objects for display or presentation onto a display device or monitor, such as a Cathode Ray Tube (CRT) or a Liquid Crystal Display (LCD). The object may be a simple geometry primitive such as a point, a line segment, a triangle, or a polygon. More complex objects can be rendered onto a display device by representing the objects with a series of connected planar polygons, such as, for example, by representing the objects as a series of connected planar triangles. All geometry primitives may eventually be described in terms of one vertex or a set of vertices, for example, coordinates (x, y, z) that define a point, for example, the endpoint of a line segment, or a corner of a polygon.

To generate a data set for display as a 2-D projection representative of a 3-D primitive onto a computer monitor or other display device, the vertices of the primitive are processed through a series of operations, or processing stages in a graphics-rendering pipeline. A generic pipeline is merely a series of cascading processing units, or stages, wherein the output from a prior stage serves as the input for a subsequent stage. In the context of a graphics processor, these stages include, for example, per vertex operations, primitive assembly operations, pixel operations, texture assembly operations, rasterization operations, and fragment operations.

In a typical graphics display system, an image database (e.g., a command list) may store a description of the objects in the scene. The objects are described with a number of small polygons, which cover the surface of the object in the same manner that a number of small tiles can cover a wall or other surface. Each polygon is described as a list of vertex coordinates (X, Y, Z in "Model" coordinates) and some specification of material surface properties (i.e., color, texture, shininess, etc.), as well as possibly the normal vectors to the surface at each vertex. For three-dimensional objects with complex curved surfaces, the polygons in general must be triangles or quadrilaterals, and the latter can always be decomposed into pairs of triangles.

A transformation engine transforms the object coordinates in response to the angle of viewing selected by a user from user input. In addition, the user may specify the field of view, the size of the image to be produced, and the back end of the viewing volume so as to include or eliminate background as desired.

Once this viewing area has been selected, clipping logic eliminates the polygons, (i.e., triangles) which are outside the viewing area and "clips" the polygons, which are partly inside and partly outside the viewing area. These clipped polygons will correspond to the portion of the polygon inside the viewing area with new edge(s) corresponding to the edge(s) of the viewing area. The polygon vertices are then transmitted to the next stage in coordinates corresponding to the viewing screen (in X, Y coordinates) with an associated depth for each vertex (the Z coordinate). In a typical system, the lighting model is next applied taking into account the light sources. The polygons with their color values are then transmitted to a rasterizer, which generates blank pixels grouped into tiles for further visibility determination or hidden surface removal and texturing/coloring of remaining pixels.

Figure 1:
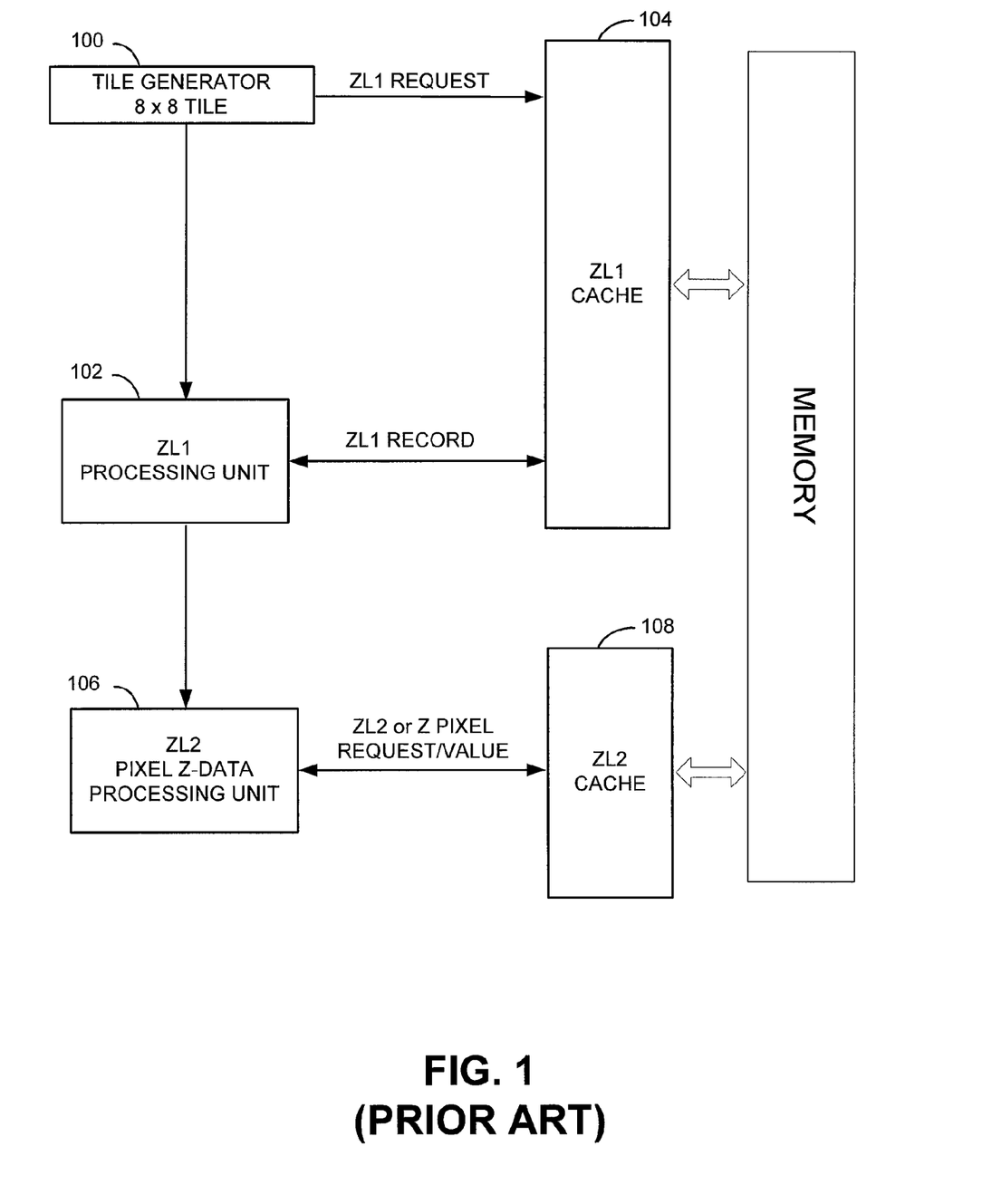
FIG. 1 is a block diagram illustrating an embodiment of a z-buffer as is known in the prior art.

Reference is now made to FIG. 1, which illustrates a modern implementation of a hidden surface removal unit, sometimes referred as a z-data processing unit. As is known, system performance is improved through the use of two-level implementation hidden surface removal pipeline. On the first level, a ZL1 unit processes the z-data for a block or tile of multiple pixels. For pixels within a tile in which the z-data exceeds the range of the format associated with ZL1, the z-data must be processed at the pixel level in a pixel z-data processing unit, sometimes referred to as ZL2.

The terms ZL1 and ZL2 generally stand for Z Buffer Level 1 and Z Buffer Level 2, respectively. There are several names for this type of algorithm including Hyper Z and Hierarchy Z Buffer. The two-level Z unit implementation allows the storage of higher level depth information for a larger block of pixels, such as a tile, and the storage of depth information for the smallest granularity, such as an individual pixel in a screen. One advantage of ZL1 is to reduce the computing complexity of depth data in the rendering pipeline.

A tile generator 100 generates tile data (i.e., a pixel mask) for the tile of pixels (e.g., an eight-by-eight grid) and sends a request to a cache, called the ZL1 cache 104. The tile data is sent to ZL1 102, which in turn communicates with the ZL1 cache 104 and defines visibility at the tile level. For the pixels having z-data that cannot be processed in ZL1 102, the z-data is processed in the pixel level z-data processing unit 106, ZL2, in coordination with a ZL2 cache 108. In this configuration, ZL1 102 can reject up to sixty-four pixels in one cycle and the non-rejected pixels are marked as accepted or retested to reduce the ZL2 106 memory traffic.

As the performance of graphics chips continues to grow, memory bandwidth requirements are becoming the overriding factor in limiting overall performance when performing operations such as those discussed above. According to Moore's Law, the increase in memory bandwidth generally lags behind the increase in on-chip computational power. Thus, in many instances, the overall performance of the graphics engine in a system is ultimately limited by the amount of video memory bandwidth available. While internal caching and data compression schemes have been used to address the issue of limited memory bandwidth, the efficiency of caching schemes is highly dependent on memory access consistency. One major issue is that the presence of triangle primitives of considerable pixel size adversely affects the performance of the cache within the graphics chip, rendering the caching scheme almost useless. Therefore, a heretofore unaddressed need exists in the industry to address the aforementioned deficiencies and inadequacies.

SUMMARY

Briefly described, one embodiment, among others, is directed to a system for reducing the external bandwidth requirements for transferring graphics data comprising a prediction error calculator configured to generate a prediction error matrix for a pixel tile of z data, a bit length calculator configured to calculate the number of bits needed to store the prediction error matrix, a data encoder configured to encode the prediction error matrix into a compressed block and a packer configured to shift the compressed block in a single operation to an external memory location.

Yet another embodiment is directed to a method for reducing external bandwidth requirements for transferring graphics data comprising: compressing the graphics data comprised of a plurality of pixel blocks by storing the prediction errors for each pixel block, calculating bit lengths for the plurality of pixel blocks, encoding the prediction errors into a compressed block, shifting each compressed block to an output bus, and transferring the compressed block from the output bus to a cache memory for later retrieval.

Yet another embodiment is directed to a method for reducing the external bandwidth requirements for transferring graphics data comprising: transferring compressed data from a cache memory to an unpacker unit, uncompressing the compressed data in the unpacker unit to obtain the prediction errors for each pixel in a pixel block, forwarding the prediction errors to an adder tree, and deriving graphics data from the prediction errors within the adder tree.

Other systems, methods, features, and/or advantages of the present disclosure will be or may become apparent to one with skill in the art upon examination of the following drawings and detailed description. It is intended that all such additional systems, methods, features, and/or advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Having summarized various aspects of the present disclosure, reference will now be made in detail to the description of the disclosure as illustrated in the drawings. While the disclosure will be described in connection with these drawings, there is no intent to limit it to the embodiments disclosed herein. On the contrary, the intent is to cover all alternatives, modifications and equivalents included within the spirit and scope of the disclosure as defined by the appended claims.

Reducing memory bandwidth requirements is paramount in modern designs of graphics processing unit (GPU) architecture. Embodiments of systems and methods for implementing graphics data compression to reduce memory bandwidth requirements and improve cache performance by compressing pixels are described. Embodiments are directed to a compression scheme for z data that reduces the large amount of memory bandwidth needed for visibility determination in a video graphics system. Various embodiments of the compression scheme take advantage of the highly repetitive nature of z data within a primitive and provide a block-based data processing scheme that provides for random access to the data when stored in external memory. Finally, another aspect of various embodiments is the ability to seamlessly implement the compression scheme into graphics chips without the need to modify the existing architecture of these chips.

In cases where there are edges within a compressed block (i.e., the compression tile encompasses one of the edges of a given triangle primitive), the compression rate will become less efficient. Nevertheless, embodiments of the z buffer codec ("z codec") provide performance sufficient to compensate for these losses. The linear nature of the change in z values is recognized for a given tile, and this attribute is utilized to achieve a highly effective delta z compression scheme. That is, various embodiments are directed to a compression scheme for storing values, which reflect a change in z values. This ultimately results in considerably less memory storage requirements than for uncompressed z data.

Graphics data generally refers to z data in a graphics pipeline in a video graphics system. Furthermore, the gradient of a three-variable function is at each pixel a 3D vector with the components given by the change in value in z with respect to the horizontal and vertical directions. At each pixel, the gradient vector points in the direction of largest possible increase in prediction error, and the length of the gradient vector corresponds to the rate of change in that direction. The z data associated with triangle primitives tends to be redundant to some extent. The vast majority of z data within a given triangle primitive is redundant. This means it's quite possible that for thousands of pixels, only two gradients are needed to effectively represent all these pixels. Thus, one of the attributes of z data is that within large triangle primitives, the z data will have a constant gradient. That is, the z data for pixels located entirely within a given triangle primitive will generally lie in the same plane. This is significant as this allows linear extrapolation of z data within a given tile of pixels. Generally, this results in very good entropy reduction for an entropy-based compressor.

Figure 2:
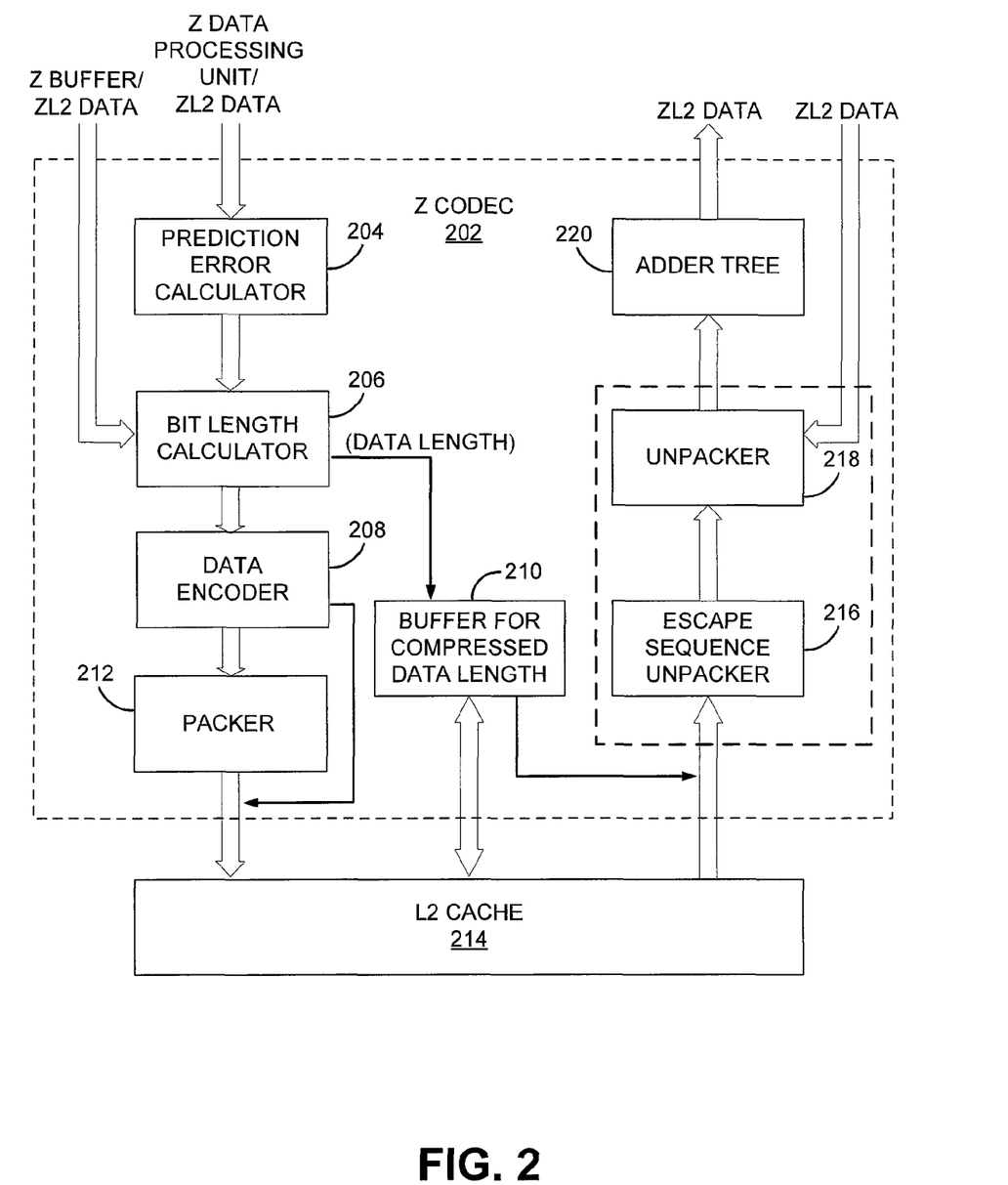
FIG. 2 depicts a top-level functional diagram for the different stages for an embodiment for graphics data compression to reduce memory bandwidth requirements.

Reference is now made to FIG. 2, which depicts a top-level functional diagram for basic components of an embodiment for implementing z data compression. In FIG. 2, a z codec 202 is shown which performs various functions in compressing z data. As illustrated, the z codec 202 may contain a prediction error calculator 204, a bit length calculator 206, a data encoder 208, a buffer for storing the overall length of the compressed z data 210, and a packer 212. These are basic components used for compressing z data. Once the z data is in its compressed state, the data is stored in the L2 (level two) cache 214 for future access. In the event the compressed z data is accessed, the compressed z data is retrieved from the L2 cache 214 and forwarded to an escape sequence unpacker 216, then to the data unpacker 218. From there, the data is sent to the adder tree 220 where the original z data is reconstructed from its compressed state.

In the compression path, the prediction error calculator 204 calculates the prediction error for each pixel in a given pixel tile (e.g., an eight-by-eight block of pixels). A reference pixel is first identified and then two reference gradients are derived. From here, the prediction error for the remaining pixels within the tile are calculated and stored in a prediction error matrix. This prediction error matrix is later used to represent all the z data within this given title.

The bit length calculator 206 calculates the number of bits which must be allocated to store the prediction error matrix (i.e., the compressed block of z data). Based on the maximum prediction error within the given title, a "full-length" value and a "half-length" value is determined. These values correspond to the number of bits required to store the prediction error for a given pixel in the event the prediction error is not zero and exceeds a certain magnitude.

The data encoder 208 encodes the prediction errors for each pixel within a given pixel tile in order to achieve increased efficiency when dealing with large triangle primitives and while reducing hardware complexity. To achieve this balance, a quantum, or bit length unit, is selected and used in encoding the compressed z data. Within the data encoder 208, if the prediction error for a pixel within a given tile is not zero and the magnitude is greater than 1, then the number of bits needed to store that error must be determined and at the same time aligned with the bit length unit selected. The total length of the word, which holds the encoded data is then stored in a buffer 210 for storage and later retrieval of the compressed z data.

Next, the encoded data is forwarded to the packer 212, which shifts the compressed blocks containing the encoded z data into memory. Depending on the magnitude of the prediction errors within different pixel tiles, the compressed blocks may be variable in size. The packer 212 shifts an entire compressed block into memory. In some embodiments, the packer is based on a barrel shifter. However, the multiplexers in the packer are controlled independently. At the packer 212, the fully compressed z data is output to the L2 cache 214 for future retrieval. As illustrated in FIG. 2, the overall length of the compressed data is also written to the L2 cache 214.

In the event that the compressed data is accessed, the compressed z data is first retrieved from the L2 cache 214 and forwarded to the escape sequence unpacker 216. The escape sequence unpacker 216 extracts the escape sequence associated with each pixel within the given pixel tile. The escape sequence is then used by the unpacker 218 to determine the number of bits associated with each piece of data embedded in the word of data. The data in this stage is comprised of prediction errors.

Finally, the uncompressed matrix of prediction errors is forwarded to the adder tree 220 where the original z data is derived and restored from the prediction error matrix. More details on the recovery of z data from the prediction error matrix are discussed further below.

Figure 3A:
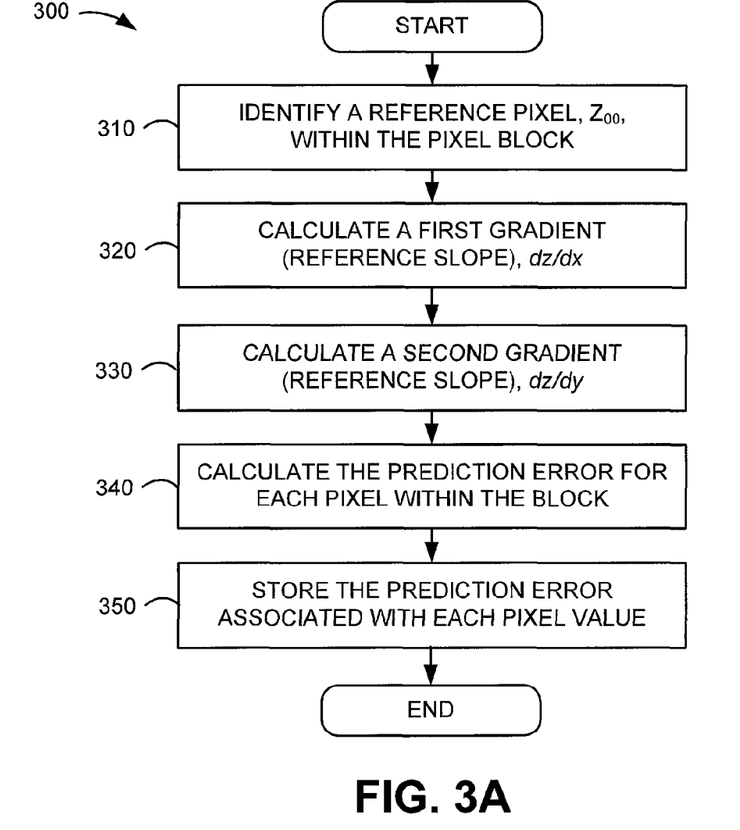
FIG. 3A depicts a top-level flowchart for an embodiment for compressing a given tile of z data compression by calculating the prediction error.

Reference is now made to FIG. 3A, which depicts a top-level flowchart of an embodiment for compressing a given tile of z data compression by calculating the prediction error. In terms of storing the z data for a given compressed block, the actual value stored by the compressor is the prediction error. Generally, the prediction error is calculated as the difference between a predicted value and the actual value. To illustrate the compression algorithm used in some embodiments, a pixel tile is first chosen to be an eight-by-eight grid of pixels. This is also known as the compressed block size. One should note that compressed block size can be any size and is not limited to eight-by-eight pixels. The first step 310 is to identify a reference pixel from which two reference gradients will be calculated. One should note that the z data discussed for various embodiments may be various sizes, including but not limited to, 24-bit z data and 32-bit z data.

The following eight-by-eight pixel tile or matrix with corresponding z values is given as:

$$Z = \begin{bmatrix} z_{00} & z_{01} & z_{02} & z_{03} & z_{04} & z_{05} & z_{06} & z_{07} \\ z_{10} & z_{11} & z_{12} & z_{13} & z_{14} & z_{15} & z_{16} & z_{17} \\ z_{20} & z_{21} & z_{22} & z_{23} & z_{24} & z_{25} & z_{26} & z_{27} \\ z_{30} & z_{31} & z_{32} & z_{33} & z_{34} & z_{35} & z_{36} & z_{37} \\ z_{40} & z_{41} & z_{42} & z_{43} & z_{44} & z_{45} & z_{46} & z_{47} \\ z_{50} & z_{51} & z_{52} & z_{53} & z_{54} & z_{55} & z_{56} & z_{57} \\ z_{60} & z_{61} & z_{62} & z_{63} & z_{64} & z_{65} & z_{66} & z_{67} \\ z_{70} & z_{71} & z_{72} & z_{73} & z_{74} & z_{75} & z_{76} & z_{77} \end{bmatrix}$$

In steps 320 and 330, the reference gradients dz/dx and dz/dy are calculated. The reference gradients are given as:

$$\frac{dz}{dx} = z_{ij} - z_{i-1,j} \text{ and} \quad [1.0]$$

$$\frac{dz}{dy} = z_{ij} - z_{i,j-1} \quad [2.0]$$

From this tile, the prediction error for every pixel within the matrix can be calculated by the following set of equations (step 340):

$$\sigma_{ij} = \begin{cases} z_{ij}, & i = j = 0 \\ z_{ij} - z_{i-1,j}, & i = 1, j = 0 \\ z_{ij} - z_{i,j-1}, & i = 0, j = 1 \\ (z_{ij} - z_{i-1,j}) - (z_{i-1,j} - z_{i-2,j}), & i > 1, j = 0 \\ (z_{ij} - z_{i,j-1}) - (z_{i,j-1} - z_{i,j-2}), & i = 0, j > 1 \\ (z_{ij} - z_{i,j-1}) - (z_{i-1,j} - z_{i-1,j-1}), & i > 0, j > 0 \end{cases} \quad [3.0]$$

Figure 3B:
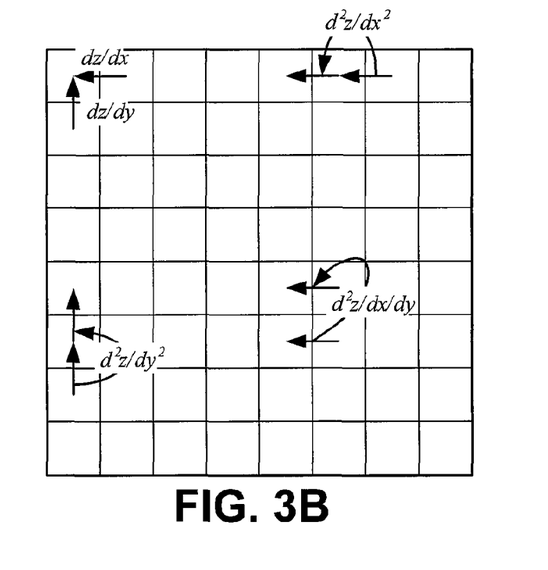
FIG. 3B illustrates the prediction error for various pixels within the tile.

FIG. 3B illustrates the prediction error for various pixels within the tile. By way of example, for the case where a pixel block is located entirely within a triangle primitive (i.e., located within the same plane), a prediction error matrix may look like the following (step 350):

$$Z = \begin{bmatrix} z_{00} & dx & 0 & 1 & 0 & -1 & 0 & 0 \\ dy & 0 & 0 & 0 & -1 & 0 & 0 & 0 \\ 0 & 0 & 1 & 0 & 0 & 1 & 0 & 0 \\ 0 & 0 & 0 & 0 & 0 & 0 & 0 & 0 \\ 0 & 1 & 0 & 0 & 0 & 0 & 1 & 0 \\ 0 & 0 & 1 & 0 & 0 & -1 & 0 & 0 \\ -1 & 0 & 0 & 0 & 1 & 0 & 0 & 0 \\ 0 & 0 & 0 & 1 & 0 & 0 & 0 & 1 \end{bmatrix}$$

Note again that the z value at the upper left corner of the pixel tile, $z_{00}$, serves as a reference pixel and dx, dy are the rounded values of the z gradients along the x-y axes. Finally, the occasional ±1s seen in the prediction error matrix above indicates rounding errors. One should note that the vast majority of the values within the table are zeros, as expected, since the pixel block is located entirely within a given primitive.

The aim of the compression algorithm in some embodiments is to reduce the external memory bandwidth required to transfer data, but does not reduce the external storage size. All compressed blocks have fixed addresses in memory and fixed allocated space, the size of which is determined by the size of uncompressed data. Furthermore, the compression algorithm is limited by significant granularity losses because of memory access quantization.

In deriving the data encoding scheme used in certain embodiments, a number of factors were taken into consideration. One consideration was the desire to maximize the efficiency of the compression scheme in cases involving large primitives (e.g., triangle primitive) that entirely encompass at least several eight-by-eight pixel tiles. Another consideration was the goal of minimizing hardware complexity. In cases where there are multiple eight-by-eight tiles totally encompassed within a given triangle primitive, calculation of the prediction errors for these matrices will look very similar to the sample prediction error matrix given above. That is, because the pixels within the pixel block all lie within a common plane, the prediction error for a vast majority of the pixels will be zero.

Thus, in some embodiments, the encoding scheme takes advantage of the hierarchical nature of z data within the architecture. For example, by examining the z data for a given compressed block (e.g., a eight-by-eight block), the maximum range of prediction error can be determined. Thus, the number of bits needed for storing a given pixel can be readily determined simply by examining the z data for a given eight-by-eight block.

Another aspect of some embodiments is the fact that the hardware implementation of the data encoding scheme has minimum complexity, thereby leading to reduced costs. To accomplish this, the number of bits that must be allocated to denote errors (i.e., instances where the absolute value of a prediction error is greater than 1) is first determined. This will be determined by the quantization level, which is pre-selected with the goal of minimizing hardware complexity (and thereby cost) while maximizing the compression ratio.

Figure 4A:
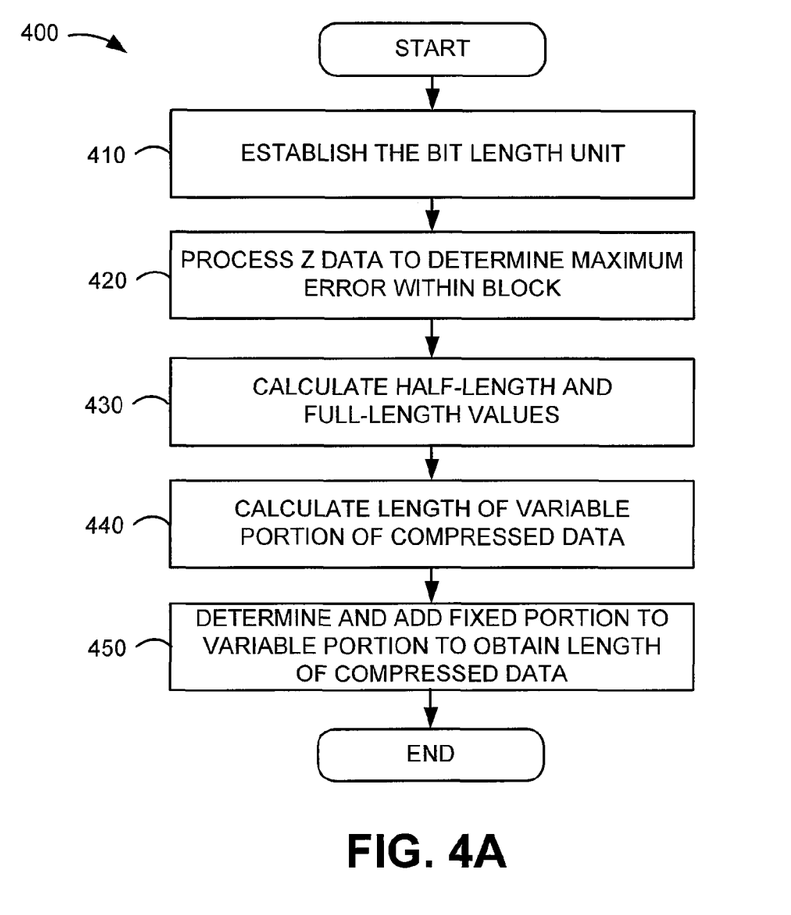
FIG. 4A depicts a top-level flowchart for an embodiment for calculating the number of bits that must be allocated for storing a compressed tile of pixels.

Reference is now made to FIG. 4A which depicts a top-level flowchart of an embodiment for calculating the number of bits that can be allocated for storing a compressed tile of pixels. By way of example, the bit length unit or quantum value is chosen to be 4 bits (step 410). In some embodiments, this value provides the optimum balance of hardware complexity while achieving the highest level of compression. The bit length unit, or quantum, is the smallest discrete unit or subdivision with which the compressed data block is aligned with. For example, if a given piece of data is 10 bits long, two additional bits would be padded onto this data block because the next closest multiple of 4 bits (the selected bit length unit) in this instance is 12 bits.

Each compressed data block which stores the prediction error for a given pixel tile is comprised of a fixed length field and a variable length field. That is, each compressed block will contain a portion that is always the same length. To determine the number of bits that need to be allocated to indicate the prediction error for a given pixel, the following steps are followed. First, the number of bits needed to represent the z data is determined. In step 420, the z data is processed to determine the maximum error within the block. The "full-length" and "half-length" values are then determined in step 430. The full-length and half-length values refer to the number of bits, which must be allocated for prediction errors, which have a magnitude greater than one. Depending on the size of the error, either a full-length or half-length number of bits must be allocated. The z data, again, denotes the maximum error within a given eight-by-eight block. By way of example, suppose the z data for this example is 14 bits long. Since the bit quantization level is 4 bits, the actual minimal length is 12 bits. Hence, possible lengths are 12, 16, 20, and 24 bits. These lengths correspond to the possible "full-length" values. In some instances, the prediction error will require fewer bits, leading to better compression. In these instances, "half-length" encoding is utilized. Full-length values of 12, 16, 20 and 24 bits will yield half-length values of 8, 8, 12, 12 bits respectively since the bit length unit for certain embodiments has been selected to be 4 bits. Next in step 440, the variable portion of the compressed data is determined. Each compressed block may have a variable portion because the magnitude of the prediction errors within a given pixel tile may be greater than a magnitude of one. Therefore, the number of half-length and full-length encoded errors may vary from one compressed block to another. Finally in step 450, the fixed portion of the storage block is determined and then added to the variable portion of the compressed block. The fixed portion of the compressed block is comprised of the following: 64 1-bit masks and 24 bits corresponding to the pixels $z_{00}$, $z_{01}$, and $z_{10}$.

Figure 4B:
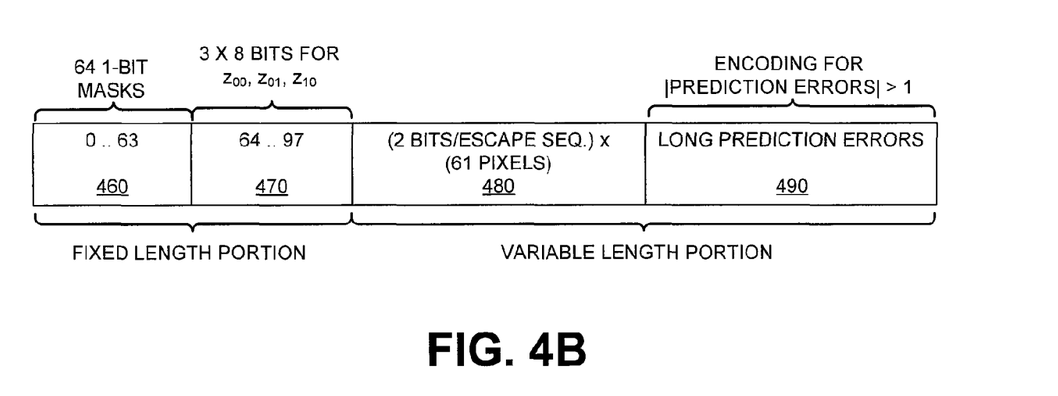
FIG. 4B illustrates the various bit fields within a given block which stores a compressed eight-by-eight pixel tile.

FIG. 4B illustrates the various bit fields within a given compressed block representing an entire eight-by-eight pixel tile. The first field 460 is comprised of 64 1-bit masks, which correspond to each pixel within the pixel tile. A value of "0" denotes a prediction error of zero. A value of "1" denotes that a 2-bit escape sequence is required. The second field 470 is comprised of 24 bits corresponding to the pixels $z_{00}$, $z_{01}$, and $z_{10}$. These two fields 460, 470 make up the fixed length portion of a given compressed block. The third field 480 is comprised of the escape sequences for the remaining pixels (i.e., the pixels outside of $z_{00}$, $z_{01}$, and $z_{10}$). This field is of variable length because a given pixel may or may not have an associated escape sequence. This would be the case if the prediction error for a given pixel is zero. No escape sequence would be necessary in this instance. The last field 490 is comprised of the long prediction errors—errors with a magnitude greater than one. Depending on the magnitude of the error, either half-length or full-length encoding will be required. Once the length of the entire encoded compressed block is determined, the length is stored in a separate buffer and 3 bits are required to specify the data length for each eight-by-eight block. When retrieving compressed z data, the length field is read before reading the compressed data in order to know how much data to read. One should note that if the length field is equal to the size of the uncompressed z data (e.g., 6 bit length units for 24-bit z data), this indicates that the data is not compressed. This feature serves the function of eliminating the possibility of the compressed data ever being larger than the data in its uncompressed state.

Figure 5:
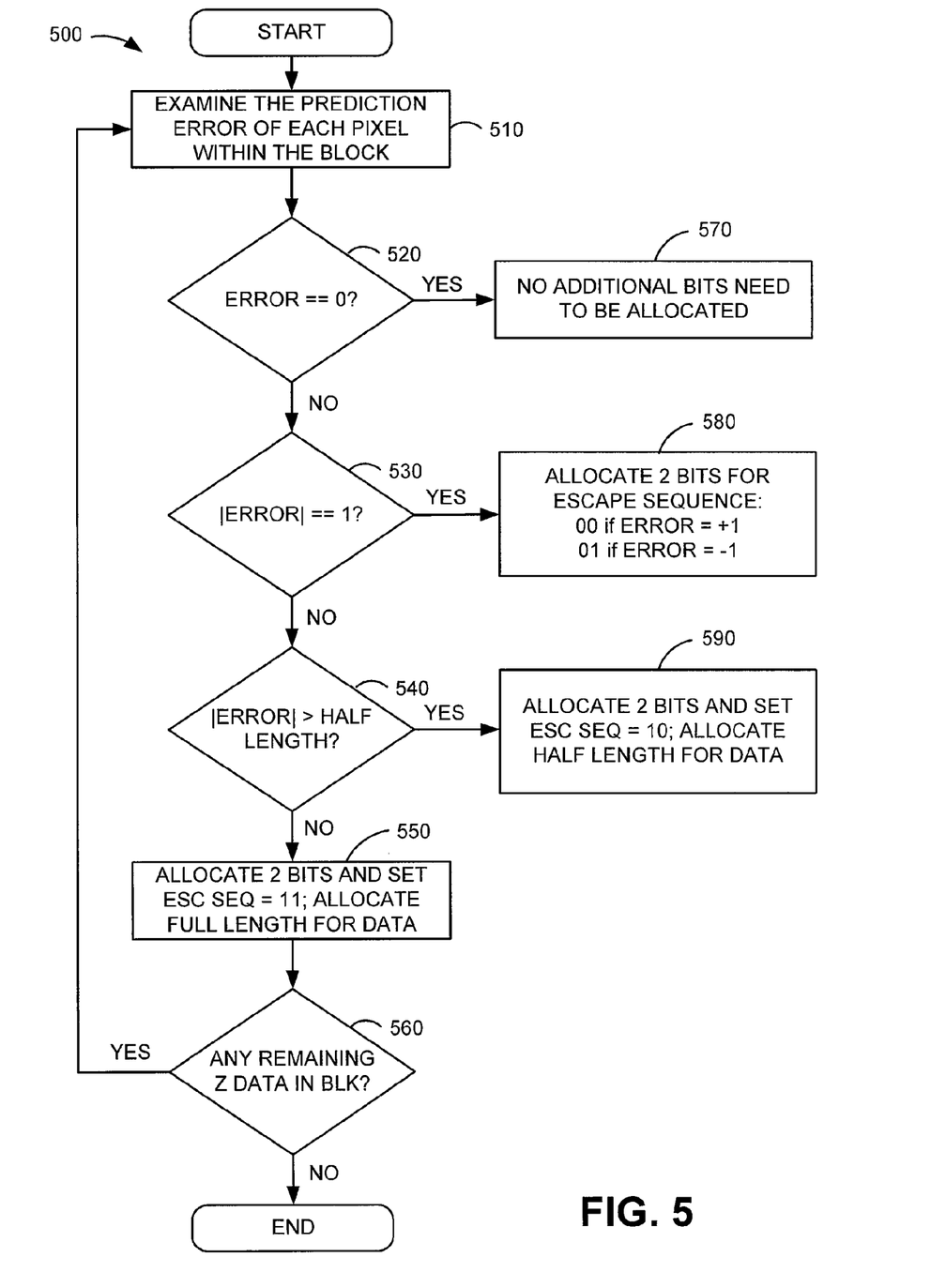
FIG. 5 depicts is a top-level flowchart for an embodiment by which the prediction error and corresponding escape sequence is allocated for encoding purposes.

Reference is now made to FIG. 5 which is a top-level flowchart of an embodiment in which the prediction error and corresponding escape sequence is allocated for encoding purposes. The bits allocated in this stage comprise the variable portion discussed in step 440 in FIG. 4. In step 510, the prediction error for each pixel (other than the three pixels in the left-top corner) in the eight-by-eight compressed block is first compared to $\{-1, 0, 1\}$. In step 520, a prediction error of "0" indicates that there is no error. Therefore, no additional bits are allocated for this particular prediction error. If the absolute value of the error is equal to 1, then only 2 additional bits are needed to represent this prediction error. This indicates that the prediction error is one. However in step 540, if the prediction error is not 1, 0 or −1, then the magnitude of the prediction error is greater than 1. Therefore, the prediction error for that particular pixel will require either full-length or half-length encoding. These steps are repeated (step 560) until all the prediction errors have been processed. The total number of bits required to store the prediction errors will comprise the variable portion of the storage block.

The 2 bits allocated in step 580 above indicate whether the prediction error is within 1 and whether half-length or full-length will be necessary to encode the bit. The possible scenarios are summarized in Table 1.

TABLE 1

| 1-Bit Mask | | |
|---|---|---|
| 0 | | The prediction error is 0. Therefore, no additional fields (bits) are required for this pixel. |
| 1 | Escape Sequence | The prediction error is not 0. Therefore at least a 2-bit escape sequence is required for this pixel |
| | 00 | Indicates that the prediction error is +1. Therefore, no additional bits are required. (No additional field corresponds to this pixel.) |
| | 01 | Indicates that the prediction error is −1. Therefore, no additional bits are required. (No additional field corresponds to this pixel.) |
| | 10 | Indicates that the absolute value of the prediction error is greater than 1, and a half-length bit field is required for this pixel. |
| | 11 | Indicates that the absolute value of the prediction error is greater than 1, and a full-length bit field is required for this pixel. |

Note that for pixels $z_{00}$, $z_{01}$, and $z_{10}$, the absolute value of the prediction error will always be greater than 1, where $z_{00}$ is the again the reference pixel located in the upper top left corner of a given pixel block. Therefore, for these 3 pixels, the 1-bit field for those pixels is used to indicate whether half and full-length will be utilized. Thus, there are no escape sequences for these three pixels. Since the minimal half-length is 8 bits, there are always 24 bits (3 pixels×8 bits) present for those pixels, which minimizes the total length of the variable length fields. These 24 bits and the 64-bit mask comprise the fixed length part of the compressed data, which is required in storing all pixel tiles. The escape sequences and the half and full-length prediction errors comprise the variable length fields. If the number of bits in whole escape sequence is not a multiple of 4, additional bits are padded onto the entire word in order to achieve alignment with the bit length unit (i.e., quantum).

Figure 6A:
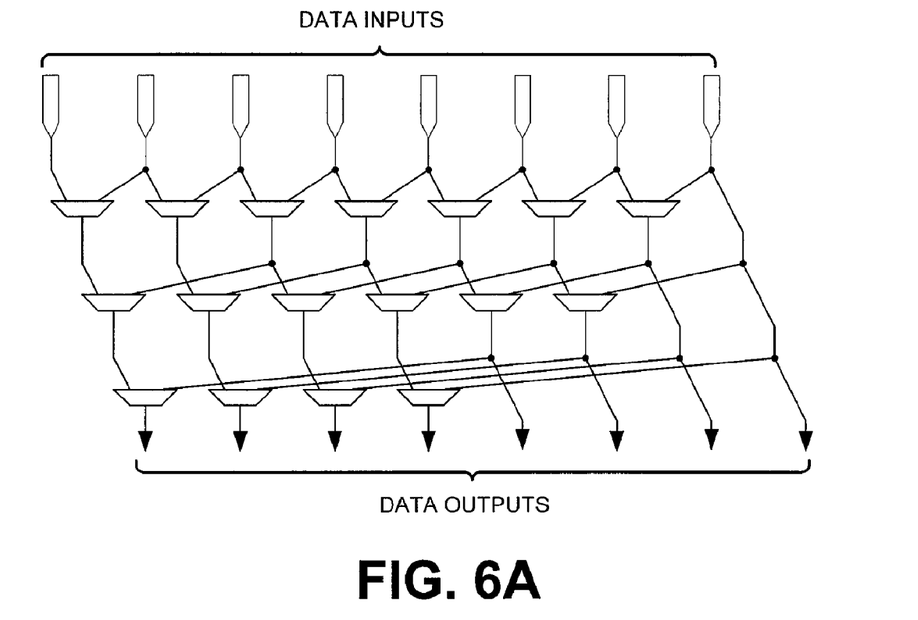
FIG. 6A shows an example of an 8-input packer unit.
Figure 6B:
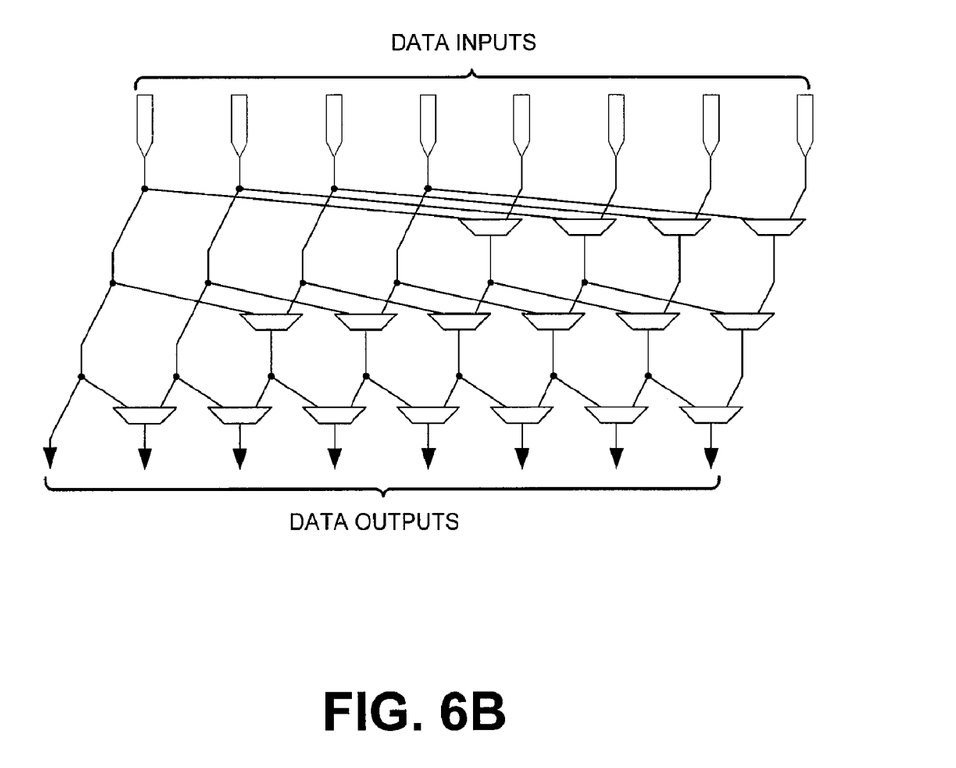
FIG. 6B shows an example of an 8-input unpacker unit.

Representative embodiments of packers and unpackers are shown in FIGS. 6A and 6B. FIG. 6A shows an example of an 8-input packer unit. The packer "packs" a series of individual words (e.g., the individual entries of the prediction error matrix) in order to avoid wasted padding bits to make the individual words align to byte boundaries. The packer is based on a barrel shifter. Generally, a barrel shifter is a device/circuit generally used for data shifting. One should note that a barrel shifter may also be emulated in software. A barrel shifter shifts a data word by any number of bits in a single operation. This avoids the need to shift a single data bit one field at a time, thereby reducing the time needed to shift an entire word. Generally, barrel shifters may be implemented through a series of multiplexers. The output of one multiplexer is connected to the input of the next multiplexer in a way that depends on the shift value.

One difference between a standard barrel shifter and the depicted packer is that each multiplexer in the packer is controlled individually. By way of example, suppose a packer is given which operates on an array of 4-bit data. If the input and output of the packer is 2048 bits, a 512-input barrel shifter would require 9 stages for shifting. Each input has a corresponding shift value assigned to it, and the shift value for each input is not less than the shift value for the previous input.

Each input's multiplexer is controlled by the LSB of the next input's shift value. Each multiplexer shifts not only data but also the shift value, thereby dropping the LSB at every stage such that the next bit becomes the LSB. Hence, a bit in a position of the original shift value corresponds to a power of two shift, which is performed on the data at the corresponding stage of the barrel shifter.

An unpacker is used in the restoration phase of z data (i.e., the decompression of z data). In the unpacker shown in FIG. 6B, the unpacker utilizes the same length data information as for the packer. The unpacker calculates the shift value for each input and then passes this value down to the multiplexers. Multiplexers for each input-to-output column use the same shift value, there is no shift value multiplexing required. Hence, a more compact shifter design may be utilized for the unpacker. The LSB is used by the last stage multiplexer, the next bit (i.e., bit 1) is used by previous stage and so on. Further information regarding packer and unpacker functionality may be found in assigned U.S. Publication Nos. 20050093873 and 20050093872, herein both incorporated by reference in their entirety.

Figure 7:
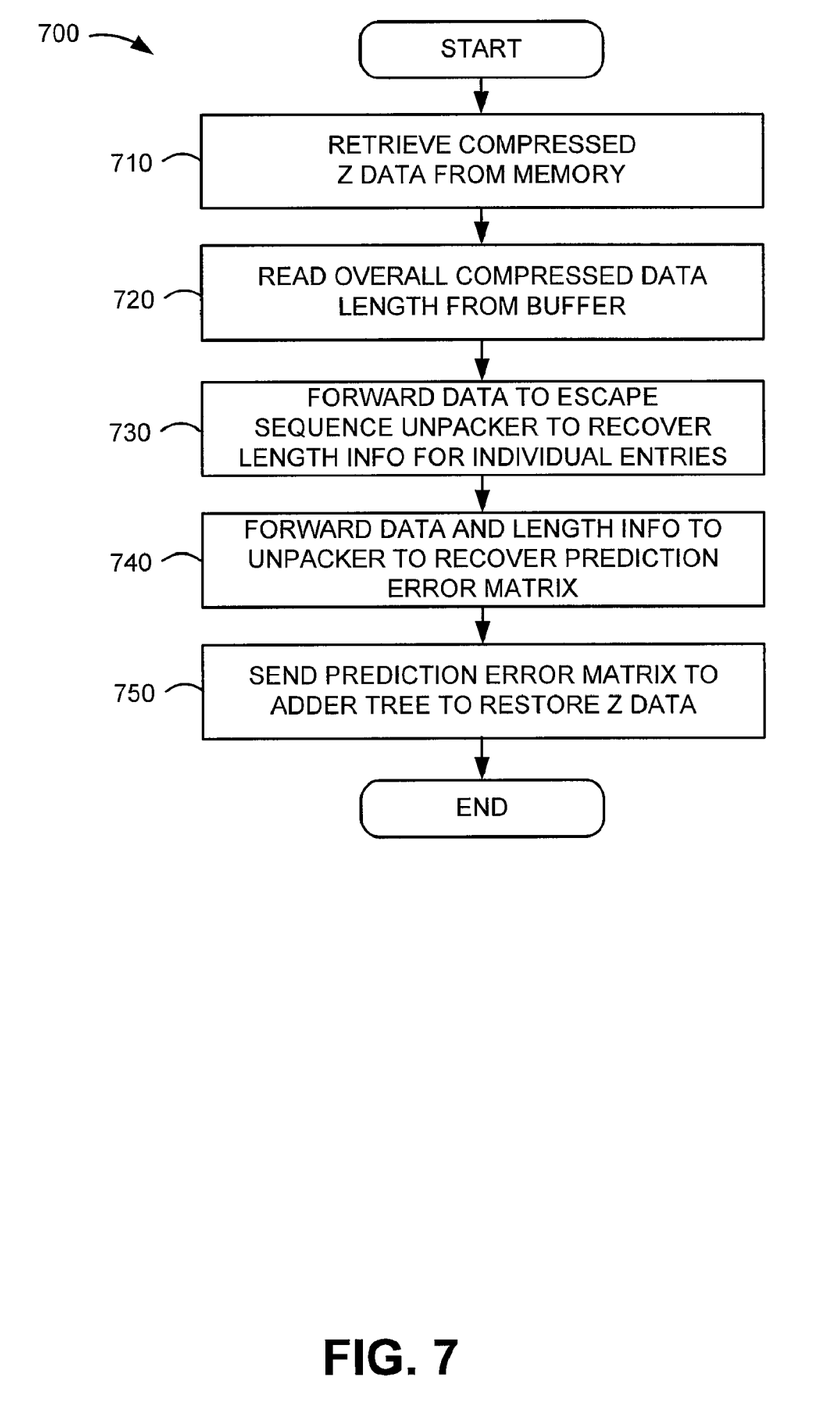
FIG. 7 is a top-level flowchart depicting an embodiment for restoring the original z data.

Reference is now made to FIG. 7 which is a top-level flowchart depicting the restoration of the original z data in some embodiments. In step 710, the compressed block of z data is retrieved from the L2 cache 214. Next, the size of this block of compressed data is read from the buffer 210 (step 720). In step 730, the compressed data is forwarded to the escape sequence unpacker 216 where the 1-bit mask for each set of prediction errors is read. The 1-bit mask for all 64 predictions values (corresponding to the eight-by-eight pixel tile) are read. This 1-bit mask serves as the input control for the escape sequence unpacker 216. Based on the value of a particular 1-bit mask, a corresponding escape sequence may be unpacked. For instance, if a "0" is read for a particular prediction error, this denotes that the error is simply zero and no further bits were allocated for storing this prediction error. However, if a "1" is read for a particular prediction error, this denotes that a corresponding 2-bit escape sequence exists. The escape sequence is subsequently unpacked and will be used in the next stage (unpacker 218).

The escape sequences that are unpacked in this stage are then used to control the unpacker 218. In the next step (740), the unpacker 218 unpacks and regenerates the prediction error matrix from the compressed block based on the escape sequence values. Depending on the value of the 1-bit mask and 2-bit escape sequence, either a half-length or full-length of bits are read. On the other hand, if the 1-bit mask for a particular prediction error is zero, then no additional bits are unpacked.

Depending on the value of this escape sequence, either more bits are read or the escape sequence unpacker proceeds to the next 1-bit mask to be read. For instance, if the escape sequence is a value of "10", then the number of bits corresponding to a half-length is read to retrieve the prediction value. On the other hand, if the escape sequence denotes a "00", then no additional bits are read because this particular value indicates that the prediction error for this pixel is +1. This process is performed in a recursive fashion until all 64 prediction errors (corresponding to the eight-by-eight pixel tile) are read.

Finally, the recovered prediction error matrix is forwarded to the last stage, the adder tree where the original z data is recovered from the prediction error matrix (step 750). In order to recover the z data from the prediction error matrix, all the values in the matrix are computed in an iterative fashion starting from the top left corner of the prediction error matrix. In this embodiment, the z data values ($z_{ij}$) are restored by applying the following equations to each entry in the prediction error matrix:

$$z_{ij} = \begin{cases} ZL1_{max} - \sigma_{ij}, & i = j = 0 \\ \sigma_{ij} + z_{i-1,j}, & i = 1, j = 0 \\ \sigma_{ij} + z_{i,j-1}, & i = 0, j = 1 \\ (\sigma_{ij} + z_{i-1,j}) + (z_{i-1,j} - z_{i-2,j}), & i > 1, j = 0 \\ (\sigma_{ij} + z_{i,j-1}) + (z_{i,j-1} - z_{i,j-2}), & i = 0, j > 1 \\ (\sigma_{ij} + z_{i,j-1}) + (z_{i-1,j} - z_{i-1,j-1}), & i > 0, j > 0 \end{cases} \quad [4.0]$$

The term $\sigma_{ij}$ denotes the prediction error for location i, j within the prediction error matrix. The term $ZL1_{max}$ denotes the maximum prediction error within the entire matrix.

Figure 8A:
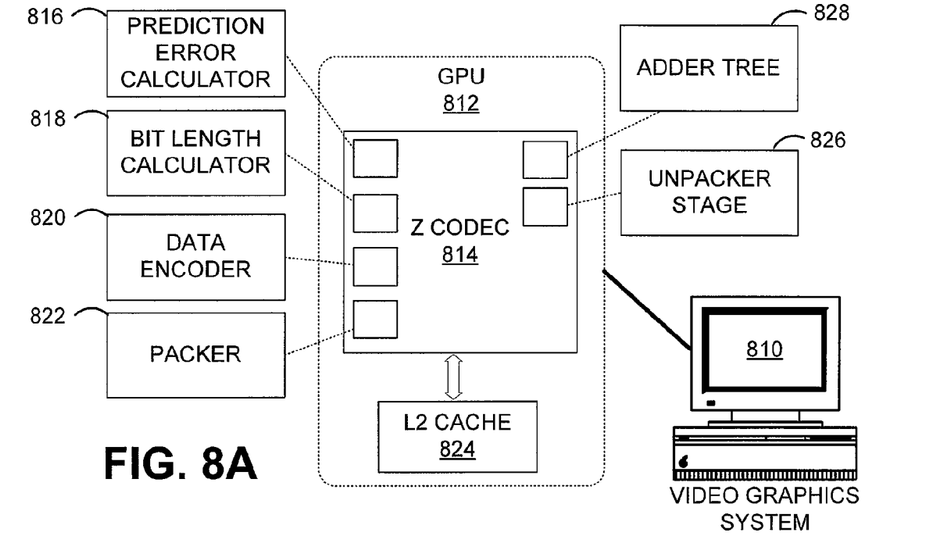
FIG. 8A depicts a block diagram illustrating various components of an embodiment for compressing z data.

FIG. 8A depicts a block diagram illustrating various components of an embodiment of a video graphics system 810. In some embodiments, the video graphics system 810 may be, but is not limited to, any type of computing device such as a desktop computer or a laptop computer.

The video graphics system 810 may include a graphics processing unit (GPU) 812, which provides programmable processing for certain functions such as pixel shading. This avoids the need to use dedicated hardware for performing these functions. A GPU 812 may be implemented as a separate coprocessor in addition to a primary processor, such as a central processing unit (CPU) within the video graphics system, that performs specialized processing tasks for which it is designed. In performing these tasks, the GPU may free the CPU to perform other tasks. In some cases, coprocessors, such as a GPU, may actually reside on the computer system's motherboard along with the CPU, which may be a microprocessor. However, in other applications, as one of ordinary skill in the art would know, a GPU may reside on a separate but electrically coupled card, such as a graphics card interface 840 in the case of the GPU.

As illustrated, the GPU 812 may include a z codec 814 and cache memory such as a L2 cache 824, used to store ZL2 data. In some embodiments, the z codec 814 includes a prediction error calculator 816, a bit length calculator 818, a data encoder 820, and a packer 822. These modules are utilized during the compression of z data. For the restoration of compressed z data, the z codec 814 may further contain an unpacker stage 826 and an adder tree 828 for deriving z data from a prediction error matrix. The unpacker stage 826 is comprised of the escape sequence unpacker 216 and the unpacker 218.

When various modules of the z codec 814 are implemented in software, it should be noted that the system can be stored on a variety of computer-readable medium for use by, or in connection with, a variety of computer-related systems or methods. In the context of this document, a computer-readable medium may comprise electronic, magnetic, optical, or other physical device or apparatus that can contain or store a computer program for use by or in connection with a computer-related system or method. The interface can be embedded in a variety of computer-readable medium for use by, or in connection with, an instruction execution system, apparatus, or device, such as a computer-based system, processor-containing system, or other system that can fetch the instructions from the instruction execution system, apparatus, or device and execute the instructions.

In the context of this document, a "computer-readable medium" stores, communicates, propagates, or transports the program for use by or in connection with the instruction execution system, apparatus, or device. The computer readable medium can be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical).

Figure 8B:
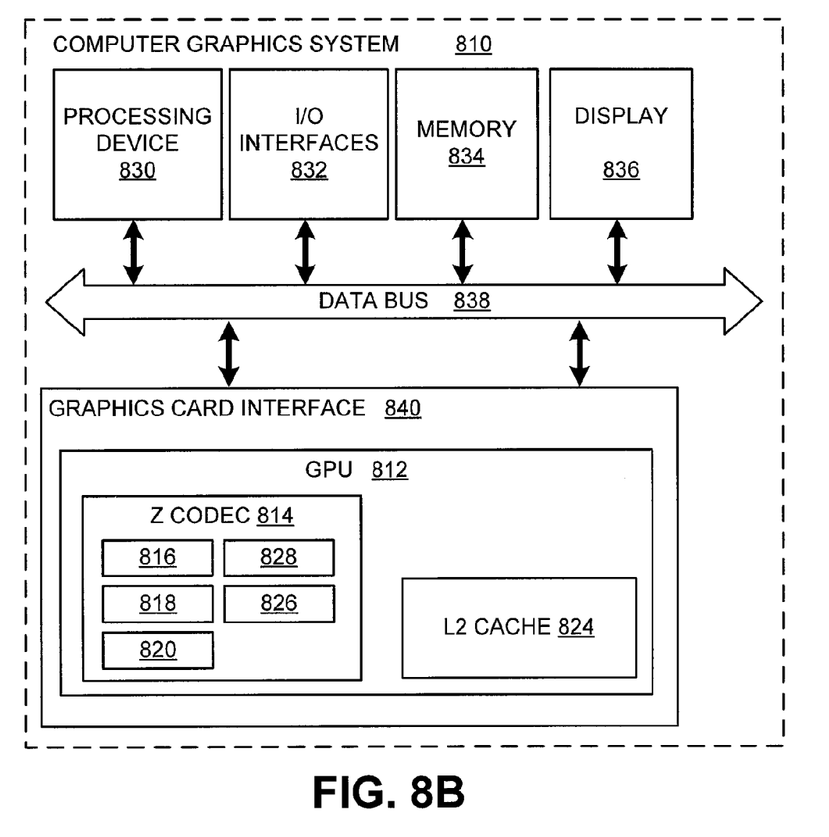
FIG. 8B depicts a block diagram illustrating an exemplary embodiment of the video graphics system.

FIG. 8B depicts a block diagram illustrating an exemplary embodiment of the video graphics system 810 in which the GPU 812 is either embedded or electrically coupled to. Generally speaking, the video graphics system 810 can comprise any one of a wide variety of wired and/or wireless computing devices, such as a desktop computer, portable computer, dedicated server computer, multiprocessor computing device, cellular telephone, personal digital assistant (PDA), handheld or pen based computer, embedded appliance and so forth. Irrespective of its specific arrangement, the video graphics system 810 can, for instance, a graphics interface 840, a processing device 830, a number of input/output interfaces 832 and memory 834, wherein each of these devices are connected across a data bus 838. Display 836 can comprise a computer monitor or a plasma screen for a PC or a liquid crystal display (LCD) on a hand held device, for example.

Processing device 830 can include a custom-made or commercially available processor, a central processing unit (CPU) or an auxiliary processor among several processors associated with the video graphics system 810, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 834 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 834 typically comprises a native operating system, one or more native applications, emulation systems, or emulated applications for any of a variety of operating systems and/or emulated hardware platforms, emulated operating systems, etc. One of ordinary skill in the art will appreciate that memory 834 can, and typically will, comprise other components, which have been omitted for purposes of brevity.

Input/output interfaces 832 provide any number of interfaces for the input and output of data. For example, where the video graphics system 810 comprises a personal computer, these components may interface with a user input device, which may be a keyboard or a mouse. Where the video graphics system 810 comprises a handheld device (e.g., PDA, mobile telephone), these components may interface with function keys or buttons, a touch sensitive screen, a stylist, etc.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

For example, it will be appreciated by persons skilled in the art, based on the description provided herein that embodiments include a method for reducing external bandwidth requirements for transferring graphics data comprising: compressing the graphics data comprised of a plurality of pixel blocks by storing the prediction errors for each pixel block, calculating bit lengths for the plurality of pixel blocks, encoding the prediction errors into a compressed block, shifting each compressed block to an output bus; and transferring the compressed block from the output bus to a cache memory for later retrieval. For some embodiments, compressing the graphics data further comprises applying a linear gradient to each pixel within the pixel block for determining the prediction error. For some embodiments, compressing the graphics data further comprises: identifying a plurality of pixel tiles each located entirely within a primitive, wherein for each pixel title the following are performed: identifying a reference pixel value $z_{00}$ within the pixel tile, determining a first reference slope value, determining a second reference slope value, calculating a linear gradient based on the first and second reference slopes, applying the linear gradient to the remaining values within the pixel block to calculate the prediction error for each pixel within the block, and storing the prediction error associated with each pixel value. For some embodiments, calculating the linear gradient is comprised of a horizontal component and a vertical component. For some embodiments, the horizontal component is represented as the derivative of z-coordinate data with respect to x-coordinate data, and wherein the vertical component is represented as the derivative of z-coordinate data with respect to y-coordinate data. For some embodiments, the maximum prediction error for a given pixel block is based on z-coordinate data of pixels.

For some embodiments, calculating bit lengths further comprises: establishing a bit length unit used to determine a quantization level of the overall number of bits needed to store a given pixel block, calculating a half-length value and a full-length value field based on the quantization level, and determining the length of a variable portion of the compressed block, wherein the variable portion and a fixed portion of the compressed block comprise the overall length. For some embodiments, determining the variable portion of the compressed block further comprises: examining graphics data for a given pixel block to determine the maximum prediction error for each pixel block, and allocating bits based on the value of the maximum prediction error. For some embodiments, utilizing half-length field encoding results in a higher compression ratio than full-length encoding. For some embodiments, encoding the compressed z data further comprises: setting a 1-bit mask associated with each pixel in a given pixel block, wherein the one-bit mask is set to a value of "0" if there is no prediction error and a value of "1" if the prediction error is not zero, and setting a 2-bit escape sequence if the 1-bit mask is not zero, wherein a value of "00" denotes that the prediction error is +1, a value of "01" denotes that the prediction error is −1, a value of "10" denotes that the prediction error requires half-length encoding, and a value of "11" denotes that the prediction error requires full-length encoding. For some embodiments, shifting each compressed block to an output bus in a single operation is performed through the use of barrel shifters with independently controlled multiplexers.

Another embodiment includes a method for reducing the external bandwidth requirements for transferring graphics data comprising: transferring compressed data from a cache memory to an unpacker unit, uncompressing the compressed data in the unpacker unit to obtain the prediction errors for each pixel in a pixel block, forwarding the prediction errors to an adder tree, and deriving graphics data from the prediction errors within the adder tree. For some embodiments, the unpacker unit is configured to perform the following: uncompress the 1-bit mask associated with each pixel within the pixel tile, uncompress the escape sequence for pixels within the pixel tile based on the 1-bit mask, and uncompress the prediction errors associated with each pixel within the pixel tile based on the escape sequence for each prediction error value. For some embodiments, deriving graphics data further comprises computing z values based on the prediction error values in an iterative fashion starting from the top left corner of the prediction error matrix.

Yet another embodiment includes a system for reducing the external bandwidth requirements for transferring graphics data comprising: a prediction error calculator configured to generate a prediction error matrix for a pixel tile of z-coordinate data, a bit length calculator configured to calculate the number of bits needed to store the prediction error matrix, a data encoder configured to encode the prediction error matrix into a compressed block, and a packer configured to shift the compressed block in a single operation to an external memory location. For some embodiments, the prediction error matrix is comprised of: a reference pixel value $z_{00}$ within the pixel tile, a first reference slope value, a second reference slope value; and prediction errors associated with remaining values within the pixel tile, wherein the prediction errors are obtained by applying a linear gradient to each value, wherein the linear gradient is based on the first and second reference slopes. For some embodiments, the compressed block is comprised of a fixed length field and a variable length field.

Another embodiment includes a system for reducing the external bandwidth requirements for transferring graphics data comprising: an unpacker configured to shift a compressed block from an external memory location and to extract a prediction error matrix from the compressed block, and an adder tree configured to derive the pixel tile. For some embodiments, the unpacker module further comprises an escape sequence unpacker configured to unpack the escape sequence for each value within the prediction error matrix. For some embodiments, the adder tree is further configured to derive the pixel tile data in an iterative fashion starting from the top left corner of the prediction error matrix.

The invention claimed is:

1. A method for reducing external bandwidth requirements for transferring graphics data comprising:

compressing the graphics data comprised of a plurality of pixel blocks by storing prediction errors for each pixel block;

calculating bit lengths for the plurality of pixel blocks;

encoding the prediction errors into a compressed block containing z data;

shifting each compressed block to an output bus; and transferring the compressed block from the output bus to a cache memory for later retrieval;

wherein encoding the compressed z data further comprises:

setting a 1-bit mask associated with each pixel in a given pixel block for indicating if there is prediction error.

2. The method of claim 1, wherein compressing the graphics data further comprises:

applying a linear gradient to each pixel within the pixel block for determining the prediction error.

3. The method of claim 1, wherein compressing the graphics data further comprises:

identifying a plurality of pixel tiles each located entirely within a primitive, wherein for each pixel title the following are performed:

identifying a reference pixel value z00 within the pixel tile;

determining a first reference slope value;

determining a second reference slope value;

calculating a linear gradient based on the first and second reference slopes;

applying a linear gradient to the remaining values within the pixel block to calculate the prediction error for each pixel within the block; and storing the prediction error associated with each pixel value.

4. The method of claim 3, wherein calculating the linear gradient is comprised of a horizontal component and a vertical component.

5. The method of claim 4, wherein the horizontal component is represented as the derivative of z-coordinate data with respect to x-coordinate data, and wherein the vertical component is represented as the derivative of z-coordinate data with respect to y-coordinate data.

6. The method of claim 1, wherein the prediction error for a given pixel block is based on z-coordinate data of pixels.

7. The method of claim 1, wherein calculating bit lengths further comprises:

establishing a bit length unit used to determine a quantization level of the overall number of bits needed to store a given pixel block;

calculating a half-length value and a full-length value field based on the quantization level; and determining the length of a variable portion of the compressed block, wherein the variable portion and a fixed portion of the compressed block comprise the overall length.

8. The method of claim 7, wherein determining the variable portion of the compressed block further comprises:

examining graphics data for a given pixel block to determine the maximum prediction error for each pixel block; and allocating bits based on the value of the maximum prediction error.

9. The method of claim 7, wherein utilizing half-length field encoding results in a higher compression ratio than full-length encoding.

10. The method of claim 1, wherein the one-bit mask is set to a value of "0" if there is no prediction error and a value of "1" if the prediction error is not zero; and setting a 2-bit escape sequence if the 1-bit mask is not zero, wherein a value of "00" denotes that the prediction error is +1;

a value of "01" denotes that the prediction error is −1;

a value of "10" denotes that the prediction error requires half-length encoding; and a value of "11" denotes that the prediction error requires full-length encoding.

11. The method of claim 1, wherein shifting each compressed block to an output bus in a single operation is performed through the use of barrel shifters with independently controlled multiplexors.

12. A method for reducing the external bandwidth requirements for transferring graphics data comprising:

transferring compressed data from a cache memory to an unpacker unit;

reading the size of the block of compressed data;

uncompressing the compressed data in the unpacker unit to obtain the prediction errors for each pixel in a pixel block according to the size of the block of compressed data;

forwarding the prediction errors to an adder tree; and deriving graphics data from the prediction errors within the adder tree;

wherein the unpacker unit is configured to uncompress the 1-bit mask associated with each pixel within the pixel block for indicating if there is prediction error.

13. The method of claim 12, wherein the unpacker unit is configured to perform the following:

uncompress the escape sequence for pixels within the pixel block based on the 1-bit mask; and uncompress the prediction errors associated with each pixel within the pixel block based on the escape sequence for each prediction error value.

14. The method of claim 12, wherein deriving graphics data further comprises computing z values based on the prediction error values in an iterative fashion starting from the top left corner of the prediction error matrix.

15. A system for reducing the external bandwidth requirements for transferring graphics data comprising:

a prediction error calculator configured to generate a prediction error matrix for a pixel tile of z-coordinate data;

a bit length calculator configured to calculate the number of bits needed to store the prediction error matrix;

a data encoder configured to encode the prediction error matrix into a compressed block; and a packer configured to shift the compressed block in a single operation to an external memory location;

wherein the data encoder sets a 1-bit mask associated with each pixel in the pixel tile for indicating if there is prediction error.

16. The system of claim 15, wherein the prediction error matrix is comprised of:

a reference pixel value z00 within the pixel tile;

a first reference slope value;

a second reference slope value; and prediction errors associated with remaining values within the pixel tile, wherein the prediction errors are obtained by applying a linear gradient to each value, wherein the linear gradient is based on the first and second reference slopes.

17. The system of claim 15, wherein the compressed block is comprised of a fixed length field and a variable length field.

18. A system for reducing the external bandwidth requirements for transferring graphics data comprising:

an unpacker configured to shift a compressed block from an external memory location and to extract a prediction error matrix from the compressed block; and an adder tree configured to derive the pixel tile;

wherein the unpacker reads the size of the compressed block and uncompresses the compressed block to obtain the prediction error matrix for each pixel in a pixel block according to the size of the compressed block, the unpacker unit is configured to uncompressing the 1-bit mask associated with each pixel within the pixel block for indicating if there is prediction error.

19. The system of claim 18, wherein the unpacker module further comprises:

an escape sequence unpacker configured to unpack the escape sequence for each value within the prediction error matrix.

20. The system of claim 18, wherein the adder tree is further configured to derive the pixel tile data in an iterative fashion starting from the top left corner of the prediction error matrix.

* * * * *